United States Patent [19]

Simmonds, Jr. et al.

[11] Patent Number: 4,480,581
[45] Date of Patent: Nov. 6, 1984

[54] DEPOSITION APPARATUS

[75] Inventors: Robert C. Simmonds, Jr., Topsfield; Andrew J. Gilbride, Swampscot; John F. Martin, Essex, all of Mass.

[73] Assignee: USM Corporation, Farmington, Conn.

[21] Appl. No.: 451,919

[22] Filed: Dec. 27, 1982

[51] Int. Cl.³ .................. C23C 13/08; B05C 1/00
[52] U.S. Cl. .................. 118/50; 118/202; 118/213; 118/245; 118/59; 427/197; 427/208.2; 427/282
[58] Field of Search .............. 118/213, 245, 202, 59, 118/50; 427/197, 208.2, 282

[56] References Cited

U.S. PATENT DOCUMENTS

| | | | |
|---|---|---|---|
| 3,608,521 | 9/1971 | Gopel | 118/202 |
| 3,653,356 | 4/1972 | Brastow | 118/202 |
| 3,658,977 | 4/1972 | Baker | 118/282 |
| 4,055,688 | 10/1977 | Caratsch | 118/202 |
| 4,063,527 | 12/1977 | Gorini | 118/202 |

*Primary Examiner*—John E. Kittle

*Attorney, Agent, or Firm*—Donald N. Halgren

[57] ABSTRACT

A machine for sequentially manufacturing a plurality of reinforced substrates such as shoe uppers, comprising a powder deposition station wherein a stencil assembly applies powder onto an annular receiving belt, the powder being applied in a three-dimensional configuration because of peripheral spacer means arranged on the cut-out between the stencil and the receiving surface. The annular receiving surface is empowered to rotate to an arcuate heating station where the powder is fused by heating elements arranged thereabove and therebelow. The fused powder is then moved to a join and cool station where a substrate is pressed against the fused powder by a transfer means causing it to press against a chill plate therebeneath. The shoe upper is lifted by the transfer means from the receiving surface after it has cooled, the transfer means rotating so as to remove the now reinforced shoe upper from the receiving surface to enable it to be removed therefrom, and a subsequent shoe upper gripped therein for subsequent reinforcement thereof.

11 Claims, 6 Drawing Figures

DEPOSITION APPARATUS

BACKGROUND OF THE INVENTION (1) Field of the Invention

This invention relates to deposition machinery useful for applying reinforcement/stiffening or decorative powder to a substrate, and more particularly to shoe machines for producing reinforcement/stiffening or decorative means for shoe uppers prior to their assembly on a shoe last.

(2) Prior Art

The shoe and apparel industry have for many years provided reinforcement/stiffening means to their products. Manufacturers of pajamas, blue jeans, sports clothing, including sports equipment such as gloves, caps with visors and the like, as well as shoe manufacturers have stitched, glued or otherwise applied layers of reinforcing material to their products for a variety of reasons. It has been standard for the industry, particularly shoe manufacturers, to apply the reinforcement/stiffening means as a layer of molten thermoplastic material adherable to a shoe upper. Early attempts at reinforcing or stiffening a shoe upper have included providing preformed stiffener elements or counters, cut from sheets of material of uniform thickness, which are inserted into a shoe upper, prior to lasting. Separate moldable sheet materials softenable by heating or by solvent have been inserted in the shoe uppers prior to lasting and are shaped in the course of lasting to a desired configuration which configuration they retain by being allowed to harden before removal of the shoe upper from the last. Shoe uppers have also been stiffened by impregnating a shoe component with a solution or dispersion in a volatile liquid vehicle of hardenable stiffener materials prior to lasting of the shoe upper, the shoe upper being stiffened by hardening of the impregnating material after the shoe is lasted.

One such way of stiffening shoe uppers is shown in U.S. Pat. No. 3,316,573 to Chaplick et al, wherein a shoe upper has a selected area in which a resiliently flexible stiffener element is fluidly deposited, and heated to a moldable point, and brought to a three-dimensional configuration which it will retain on cooling.

Another arrangement for coating shoe parts is shown in U.S. Pat. No. 3,342,624 to Kamborian, wherein a stencil plate rests upon a shoe upper, a concave support surface holds the combination, whereupon a doctor blade wipes across the plate to deposit a fluid stiffener into the depression in the shoe upper.

A more recent arrangement for stiffening shoe components, is shown in U.S. Pat. No. 3,973,285 to Babson et al, comprising an arrangement for depositing a molten charge of thermoplastic on a shoe upper held in a margin clamping means.

The prior art arrangements may occasionally work well, but they have difficulty producing a stiffener of uniform thickness over seams and overlaid patterns. The adhesion of the stiffener at its edges is often poor. Rough edges, and strings or "spider webs" characteristic of the process may all be present. The machines may leak their molten material out of the connecting joints, nozzles may drool and patterns may require time and patience to change.

The materials usable in these prior art machines are limited to certain viscous flow and heat stability characteristics which necessitate careful tailoring—often comprising the performance of the final product. These specialty materials are also more costly.

Thus it is an object of the present invention to provide an apparatus which will overcome the shortcomings of the prior art.

It is a further object of the present invention to provide a reinforcement/stiffening or decorative means in a desired configuration to a flexible substrate such as a shoe upper or piece of cloth-type material, which configuration may be readily changed to facilitate various shoe upper patterns or styles or reinforcement/stiffening or decorative requirements of the garment with conveniently made low cost stencil tooling.

It is yet a further object of the present invention, to provide an apparatus which will manufacture a smooth stiffened/reinforced or decorative shoe upper, or article of cloth or the like, without the inconveniences of the prior art.

BRIEF SUMMARY OF THE INVENTION

The present invention comprises an apparatus for reinforcing/stiffening/and/or decorating substrates such as clothing, sports equipment, or the underside portions of shoe uppers, by the application thereon of a fused powdered material. The apparatus comprises a generally cylindrically shaped frame having a circular receiving surface horizontally rotatable about a plurality of arcuately spaced work stations arranged about the frame. The first station comprises a deposition station. The second station comprises an arcuate array of heating elements and the third station comprises a join and cool and/or press station. The deposition station is synchronously arranged for slight up and down movement over the horizontally rotatable receiving surface, in timed relation to a support plate arranged for slight up and down movement beneath the receiving surface. The deposition station includes a stencil means which receives a supply of powder through a conduit attached to a supply hopper above the frame. The stencil means comprises a reciprocably movable dispenser-carriage arranged in a housing structure, the bottom surface of which comprises a stencil assembly. The stencil is the replacable lower surface of the housing, having a smooth impermeable upper surface, a foil-like lower surface and a screen "sandwiched" therebetween, a cut-out being arranged in and aligned between the upper and lower surfaces, as recited and hereby referenced in copending U.S. patent application Ser. No. 452,964, filed Dec. 29, 1982 and, entitled Linear Deposition Apparatus of R. Simmonds, Jr., et al, and U.S. patent application Ser. No. 451,918, filed Dec. 27, 1982 and entitled Stencil Apparatus by A. Morse et al, each assigned to the assignee of this application. The dispenser-carriage may be reciprocably moved across the stencil assembly by a cable cylinder arrangement, similar to the dispenser-carriage arranged in copending U.S. patent application Ser. No. 452,962 filed Dec. 29, 1982 and entitled A Method of Applying a Fusible Powder by R. Simmonds, Jr., et al or by a motor arranged with a rack and pinion gearing setup between the dispenser-carriage and the housing structure. The carriage has a pair of wiper blades movably disposed one on each side thereof. Each blade is reciprocably arranged to move downwardly as the other blade is moved upwardly, by being pivotally linked to one another and to a pneumatically powered bell crank system actuated by switches operable when the dispenser-carriage gets transported to its particular end of the housing structure, which dispenser-carriage contains the powder to be applied to the circular receiving belt through the cut-out in the stencil assembly. The lower surface of the stencil may have a partial peripheral stand-off gasket which may keep one side of the cut-out raised from and thus "skewed" with respect to the rotatable horizontal receiving surface, more than the other side of the cut-out, thus producing a configuration of powder of varying thickness thereon. The gasket may be of tapered thickness towards its ends, or it may be of uniform thickness depending upon the desired product, and it may be arranged around the entire periphery of the cut-out. The support plate is disposed beneath the receiving surface and is movable up and down by a pressurizable piston and cylinder unit arranged between the support plate and the frame portion. A shim or strip of gasket-like material may be disposed on the support plate in a predetermined relation to the gasket on the screen thereabove to provide a scarf or taper to certain patterns of powder deposited on the receiving surface.

The deposited three dimensional powder configuration on the circular receiving surface gets transported an angular amount to the first heating element, about one-eighth of a revolution, by action of a motor adapted to rotate the circular receiving belt. As the circular receiving belt is rotated in a step-wise manner, successive deposits of three-dimensional powder is serially applied by the stencil to successive locations on the circular receiving belt as they appear under the deposition station in its low portion of its cycle.

The frame of the apparatus comprises a generally horizontally disposed upper portion and a horizontally disposed middle portion, above which the circular receiving belt is arranged. A pair of support rods are journalled through tubular bearings secured to the upper frame portion, and extend vertically downwardly therefrom, and are attached, one at each end, to the frame of the deposition station. The support rods have upper ends which are connected by a horizontal bar member. A follower wheel is spaced inwardly from each support rod, on the lower end of an arm and directed downwardly from the horizontal bar member. A rotatable shaft is journalled at each end thereof in a housing secured to the top end of the tubular bearings containing the support rods. A cam member is fixed to the rotatable shaft near each end thereof, in rolling contact with the follower wheels supported from the horizontal bar member. A pneumatically operated piston and cylinder unit is attached to the upper portion of the frame, and has a piston rod extending therefrom, in pivotal contact with an arm extending off of the rotatable shaft. The piston and cylinder unit is in fluid communication with a properly activatable synchronizable pressure source.

The heating stations comprise a plurality of arcuate segments consecutively arranged on top of the middle portion of the frame. The arcuate segments comprise about 240 degrees of lower, circumferentially spaced heating elements. Each segment has a plurality of orificii therethrough which are in fluid communication with a vacuum system in addition to their heating elements therewithin. A plurality of radiant heating units are suspended, each from a hanger, from the upper portion of the frame, in an arcuate array, above the receiving belt and above the array of heaters arcuately arranged on the lower frame member. The heating units are electrically activated by interconnection with conduits supplying electrical energy from a proper source.

The circular receiving belt comprises an inner hub and an outer annular ring in a planar relationship, between which, a web of glass fibers or metal cloth, coated with polytetrafloroethylene is tensioned. The inner periphery of the receiving belt fits into a collar arrangement comprising the inner hub. The outer periphery of the receiving belt comprises a plurality of links, pivotally connected to one another at their ends, which ends are secured by radially directed fingers to the outer annular ring. The links have the outer periphery of the receiving belt overlapped and secured thereafter to form chord-like segments of a polygon. The inner hub comprises a fitting having an internal spline tooth configuration at its center. The spline toothed fitting mates with a shaft secured at its lower end, to a motor, mounted at the base of the frame.

A splined shaft extends upwardly in a reciprocably matable relationship from the spline toothed fitting into a reciprocably movable (upwardly and downwardly) gear housing with the frame system. The gear housing provides the means for allowing rotational input into a substrate transfer cube comprising the pressing station which pressing station has a horizontal beam supported above the upper frame portion by a pair of reciprocable shafts vertically journalled in the upper frame portion. The shafts have lower portions which are affixed to opposed shoulders on each side of the gear housing. A pressurizable piston and cylinder unit is vertically arranged within the upper frame portion between the reciprocable shafts to provide the power for the reciprocating up-and-down motion thereof. The piston has a piston rod which extends downwardly therefrom and is attached to an inverted "U" shaped bracket, the distal ends of which are attached to the top of the gear housing. The "U" shaped bracket has a pair of tabs which extend off of its forward end. A shaft is arranged horizontally between the tabs of the bracket. A leg is swingably disposed in the horizontal shaft between the tabs. The distal end of the leg has a foot portion which protrudes forwardly therefrom. A pressurizable piston and cylinder unit which is in fluid communication with a proper synchronized pressure source, is secured to the top of the gear housing and is disposed within the walls of the inverted "U" shaped bracket. A piston rod extends from the cylinder and is pivotally connected to a mid-point of the leg. The gear housing encloses a forwardly directed (towards the front of the machine) output shaft in rotational communication with the splined shaft which reciprocably extends into the internally splined hub within the receiving belt hub, which hub is in rotative communication with the motor. A support hub extends from the front side of the gear housing, around the forward shaft, which support hub rotatively receives the transfer cube thereon, by mating with an annular socket arranged in the backside of the cube. The cube has four planar faces which are parallel to its axis of rotation. Each face has a partition extending off its backside edge, perpendicular to the face, and a pair of parallel partitions, perpendicular to the face and the edges adjacent the backside edge. A slot is cut-into each partition, near its distal edge. A holding bracket is slidably received into the slots in the partitions extending from each of the four planar faces parallel to the axis of rotation of the cube. A biased plate is held against each planar face, and behind (beneath) each bracket, within the partitions of the cube by a biased camming means through each face of the cube. The biased camming means comprises a first lever, one end of which is pivotally attached to the inwardly directed side of each biased plate. The other end of the first lever is bifurcated and has a pin therethrough, which end of the lever mates with a block arranged within the cube. The pin extends beyond the sides of the first lever, and into a slot in the sides of the block for guidance therein. A second lever is pivotally arranged on the pin between the bifurcations of the first lever, and is attached to the inward end of a rod which extends through the back end of the cube just outside of the annular socket. The other end of the rod which extends rearwardly from the cube, is spaced so as to be contactable with a rub-ring of 270 degree configuration about the support hub on the front side of the gear housing.

A chill plate is disposed beneath the transfer cube, on the middle portion of the frame. The chill plate has a refrigeration means therein, in the form of cooling coils connected to a refrigeration unit.

An arcuate stationary plate is secured to the middle portion of the frame, on the other side of the chill plate from the heating segments. Thus, a complete annular base, is attached to the middle portion of the frame, one portion of which comprises the deposition base, the major portion comprising the arcuate heating segments, one arcuate portion comprising the chill plate, and an arcuate stationary plate which thus comprises the locus of (and support for) travel of the receiving belt, which rotates thereon.

In the method of operating the reinforcing and stiffening apparatus, a powdered polymer material such as ionomer, polyethylene, ethylene vinyl acetate, polyvinylchloride or nylon at about a 35 to 100 mesh size, suitable for being heated, fusing, and being adherable to a relatively flexible substrate such as a shoe upper or a piece of cloth or the like, is deposited in the hopper, supported above the upper portion of the frame of the apparatus. More explicit examples of the material are recited below. The powder drops down from the hopper, through the conduit secured beneath the hopper and into the dispenser-carriage on the deposition means. The circular receiving belt arranged beneath the deposition means is supported therebeneath to move it into touching contact with gasket and any spacer means on the bottom side of the stencil, by activation of the support plate arranged immediately therebeneath as the stencil and deposition means is lowered by its support rods which are in cammed relation to their bearings and upper frame portion.

The completion of a radially outwardly and a radially inwardly directed synchronized sweep by the dispenser-carriage in the housing thus transfers the powder in the dispenser-carriage across the stencil and through the cut-out in the stencil, causing a three-dimensional array of powder to be configured onto the receiving belt. The sweep of the dispenser-carriage by empowerment means such as a stepping motor arranged with a rack and pinion gear system or by the cable cylinder, as identified in our aforementioned copending U.S. patent application Ser. No. 452,964, causes a cam mounted on the frame of the holding unit to actuate a switch, dropping the support plate beneath the receiving belt. A cam on one of the rods guiding the support plate is caused to strike a switch, signalling its withdrawal to an out-of-the-way position to permit a signal to first raise the deposition means by rotating the cammed shaft connected to its support rods, and also a signal to be sent to the motor, through appropriate circuitry, to rotatively advance the receiving belt and its three-dimensional configuration of powder thereon 45 degrees to the first of a series of heating localities to enable the powder to melt and fuse into a sticky mass. The holding unit of the deposition station is thus again signalled to be lowered into contact with the receiving belt with the support plate rising therebeneath, the deposition station effectuated to a sweep of thereof by the wiper blades mounted on the dispenser-carriage, thus depositing a successive three-dimensional array of configured powder on the receiving belt, the cycle continuing, each heating station heating the configured three-dimensional arrays of successive masses of powder radiantly from above at about 500°–700° F. and beneath the stepwise rotating belt at a temperature of about 375°–500° F., depending on the particular powder, as discussed in the examples following, each configuration losing the discreteness of its powder and becoming a fused shaped entity on the belt as the latter rotates in a stepwise manner through the heating cycle, which cycle comprises about 270 degrees of its circumference and takes about 25 seconds to fuse.

An unreinforced (flexible) article, to be reinforced, such as a shoe upper or a piece of cloth for a cap visor, a shirt collar, a knee patch, a sports glove or the like is placed between the biased plate and the holding bracket held by the partitions on three sides thereof. The holding bracket may have any configured opening therethrough sufficient to expose that portion of the article to receive the fused mass of heated powder. The unfinished or bottom (inner) side of the article, a shoe upper in the preferred embodiment, faces away from the axis of rotation of the cube, as it is gripped therewithin. The cube is rotated in timed sequence with the rotation of the rotatable receiving belt. That is, the cube rotates 90 degrees about its axis for every 45 degree rotation of the rotary belt. This is to allow an unreinforced article such as a shoe upper or the like to be presented in a spaced relationship immediately above a viscous three-dimensional configuration of melted powder on the rotary receiving belt therebelow prior to its being pressed thereagainst. The motor beneath the splined hub effectuates rotation of the rotary receiving belt also effectuates rotation of the cube, through the splined shaft comprising the interlinkage between the splined hub and the gear housing including the linkage through the collar, to the cube. The pressurizable piston and cylinder unit vertically arranged within the upper frame, for raising and lowering the transfer cube and gear housing, is periodically advanced and retracted, through proper actuation means, in timed relationship with the rotation of the transfer cube and presentation of an unreinforced article thereby. That is, the configuration of fused powder on the rotary belt is presented in timed relation at the press station and above the chill plate to the unreinforced substrates as they are supplied thereabove by the transfer cube as fed to the same by the machine operator.

Upon retracting of the piston within the cylinder in the upper frame, the cube is withdrawn from a pressed relationship against the rotary receiving belt. After the three-dimensional configuration of viscous (sticky) matter has thus been cooled to about 30° F. to 100° F. and caused to adhere to the bottom side of the article, (here a shoe upper), the cube is then caused to rotate 90 degrees to present a successive unreinforced article on its successive lowermost face to a successive viscous mass rotated thereunder on the rotary receiving belt, to be lowered and pressed against the fused configuration of powder on the receiving belt and similarly joined as were the previous entities.

The now cooled and reinforced article on the side of the cube is ready for removal therefrom, by an operator, because the biasing plate is caused to be retracted inwardly towards the axis of rotation of the cube, because the bias camming means has rotated out of contact with the rub-ring thus permitting the newly reinforced article to be removed from between the biased plate and the holding bracket to await a subsequent receipt of an unreinforced article, such as a shoe upper or other article (substrate) once the transfer cube has rotated to the next 90 degree point of rotation (the "12 o'clock" position) to present to the operator an unloaded face of the transfer cube.

BRIEF DESCRIPTION OF THE DRAWINGS

The objects and advantages of the present invention will become more apparent, when viewed in conjunction with the following drawings, in which.

DESCRIPTION OF THE PREFERRED EMBODIMENTS

Figure 1:
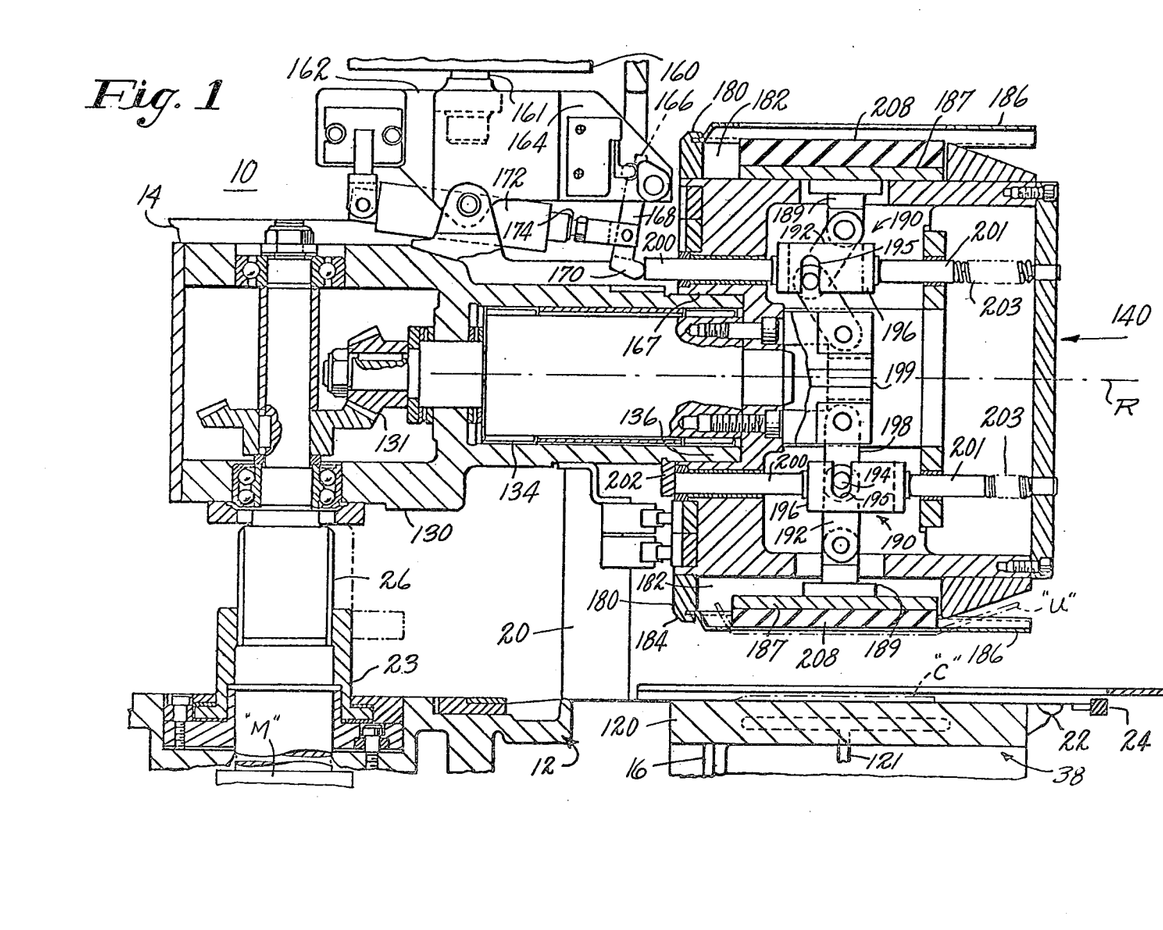
FIG. 1 is a sectional view of a portion of the machine taken along its center.
Figure 2:
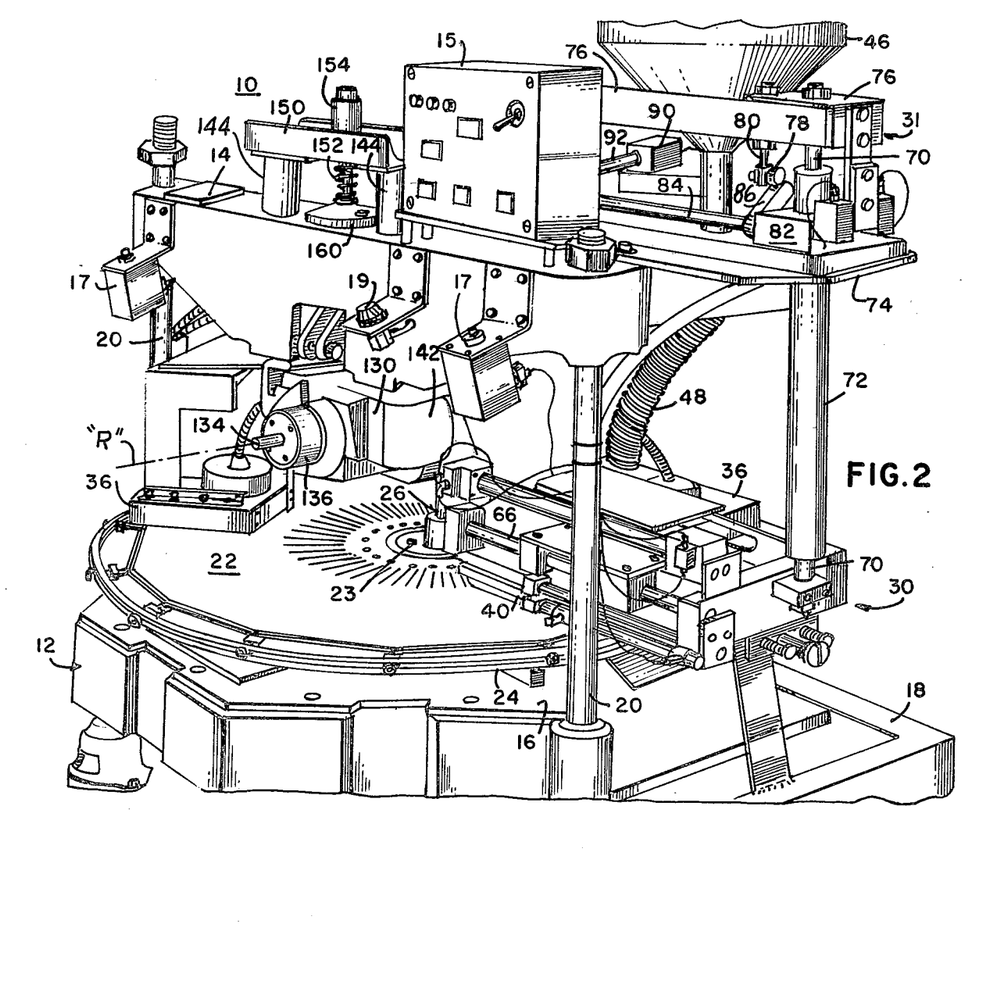
FIG. 2 is a perspective view of the front of the machine, with portions thereof omitted for clarity.

Referring now to the drawings in detail, and particularly to FIGS. 1 and 2, there is shown a reinforcment application machine 10. The machine 10 comprises a generally cylindrically arranged frame 12 having a horizontally disposed upper frame portion 14, and a horizontally disposed middle frame portion 16, supported on a frame base 18. The frame 12 includes a plurality of upright columns 20 securing the upper frame portion 14 to the middle frame portion 16. A control panel 15 is mounted on the upper frame portion 14, and a pair of start switches 17 and a stop switch 19 are attached to the front of the upper frame portion 14.

A circular receiving surface or rotary belt 22, having an outer support ring 24, is horizontally rotatable about a hub 23 through which a splined shaft 26 is arranged, the receiving surface 22 being arcuately advancable, counter clockwise in this embodiment, in a stepped manner through a plurality of arcuately spaced work stations, arranged beneath the upper frame portion 14 and on elements of middle frame portion.

The first work station comprises a powder deposition station 30, shown most clearly in FIGS. 2, 4, 5 and 6. The second work station comprises a heating station 32, consisting of a plurality of arcuately arranged lower heating elements 34 and upper heating units 36, shown in FIGS. 3, 4 and 5. The third station may comprise a load/press station 38, shown generally in FIG. 1. The load station 38 may include chill means and press/transfer means, described below. The circular receiving surface 22 is preferrably made from a web of woven glass fibers or from a thin woven stainless steel web, about 0.010 inches thick, covered on both sides by a smooth reinforced film of polytetrafluroethylene or the like, which permits release of any fused powder therefrom. The thin web of either receiving surface material permits rapid cycling from fusion heat to cold press because of its thermal mass. The bottom side of the receiving surface 22 is in sliding contact with the arcuate array of lower heating elements 34 of the second work station.

The deposition station 30 is supported by a reciprocating means 31 secured to the upper frame portion 14. The deposition station 30, comprises a rectangular frame 40 arranged at least partially over and parallel to the horizontal receiving surface 22. The bottom of the deposition station 30 comprises a stencil assembly, including a replaceable template or stencil 42. The stencil 42 comprises a lower wire mesh screen supported in a frame. The wire mesh screen has a smooth impervious uppermost surface adhered thereon, and a lowermost foil-like surface adhered thereunder, each surface having a cut-out arranged thereacross and aligned with one another. The cut-out is formed into the desired shape of the powder to be deposited onto the receiving belt, as recited in the copending U.S. patent applications Ser. No. 452,964 filed Dec. 29, 1982 and entitled Linear Deposition Apparatus, by R. Simmonds, Jr., et al and Ser. No. 451,918 filed Dec. 27, 1982 and entitled Stencil Apparatus by A. Morse et al, incorporated herein by reference. A dispenser-carriage 44 is slidingly arranged in the frame 40 of the deposition station 30.

Figure 4:
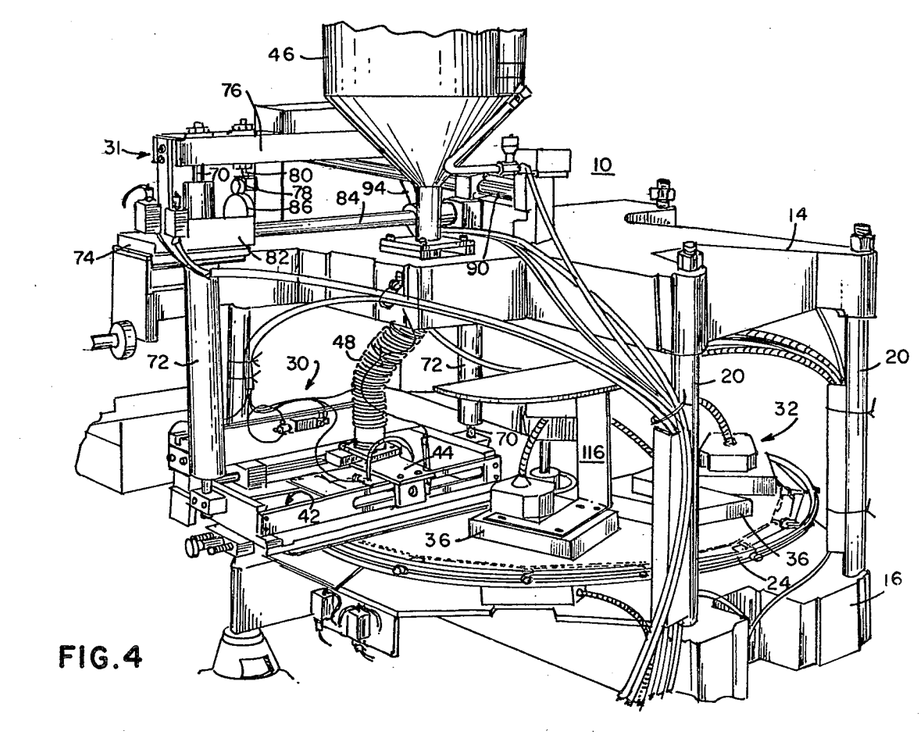
FIG. 4 is another perspective view of the machine, showing the backside thereof.

A holding tank or hopper 46 is supported in the top side of the upper frame portion 14, to hold fusible powder "P" prior to its distribution on the receiving surface 22. A flexible conduit 48 has one end arranged at the bottom of the holding tank 46, the other end of the conduit 48 being attached to the dispenser-carriage 44 for distribution of powder therethrough during operation of the deposition station 30. The dispenser carriage 44 has a pair of wiper blades 50, one arranged on each side of the carriage 44, only one being shown in FIG. 6. The wiper blades 50 are linked together to operate reciprocably about a common axis. The wiper blades 50 are each regulated by a pressurizable piston and cylinder unit 54, having a piston rod 56 which is articulated with a pivotable bell crank lever 58. Each bell crank lever 58 has an arm which is pushable against a tab 60 on each respective wiper blade 50. When one wiper blade 50 is pressed downwardly against the smooth impervious upper surface of the stencil 42, the other wiper blade 50 is brought to its raised orientation. An arrangement of cammable valves 62 and 64 are spaced along one side of the rectangular frame 40 of the deposition station 30 to control the pressurization of the piston and cylinder units 54 moving the wiper blades 50. A pressurizable cable cylinder 66 is arranged along one side of the rectangular frame 40 articulated with the carriage 44 to provide the motivation for the dispenser-carriage 44 to sweep across the stencil means, as described in the above-mentioned copending U.S. patent application Ser. No. 452,964, A support rod 70 is attached at its lower end, to each end of the rectangular frame 40 of the deposition station 30. Each support rod 70 extends through a tubular bearing 72. Each tubular bearing 72 is fixed near its upper end, to a plate 74 attached to the upper frame portion 14 as shown in FIG. 4. Each support rod 70 extends out of from the top of its respective tubular bearing 72, and is attached to a horizontal bar member 76. A follower wheel 78, is attached to the lower end of a short arm 80, which is attached to the bar member 76, spaced inwardly from each tubular bearing 72. A housing 82 is arranged near the top end of each tubular bearing 72, journalling a rotatable shaft 84 therebetween, as shown in FIGS. 2 and 4. A cam member 86 is secured to each end of the rotatable shaft 84, each being in rolling contact with its respective follower wheel 78 attached to the short arms 80, only one shown, disposed from the horizontal bar member 76. A pressurizable piston and cylinder unit 90 is secured to the upper frame portion 14, and has a piston rod 92 extending therefrom, which is in swingable contact with a lever 94 extending radially from the rotatable shaft 84. The pressurizable piston and cylinder unit 90, like the other piston and cylinder units, is connected to proper pressurizable sources, which is synchronized to effectuate their reciprocable articulation.

Figure 5:
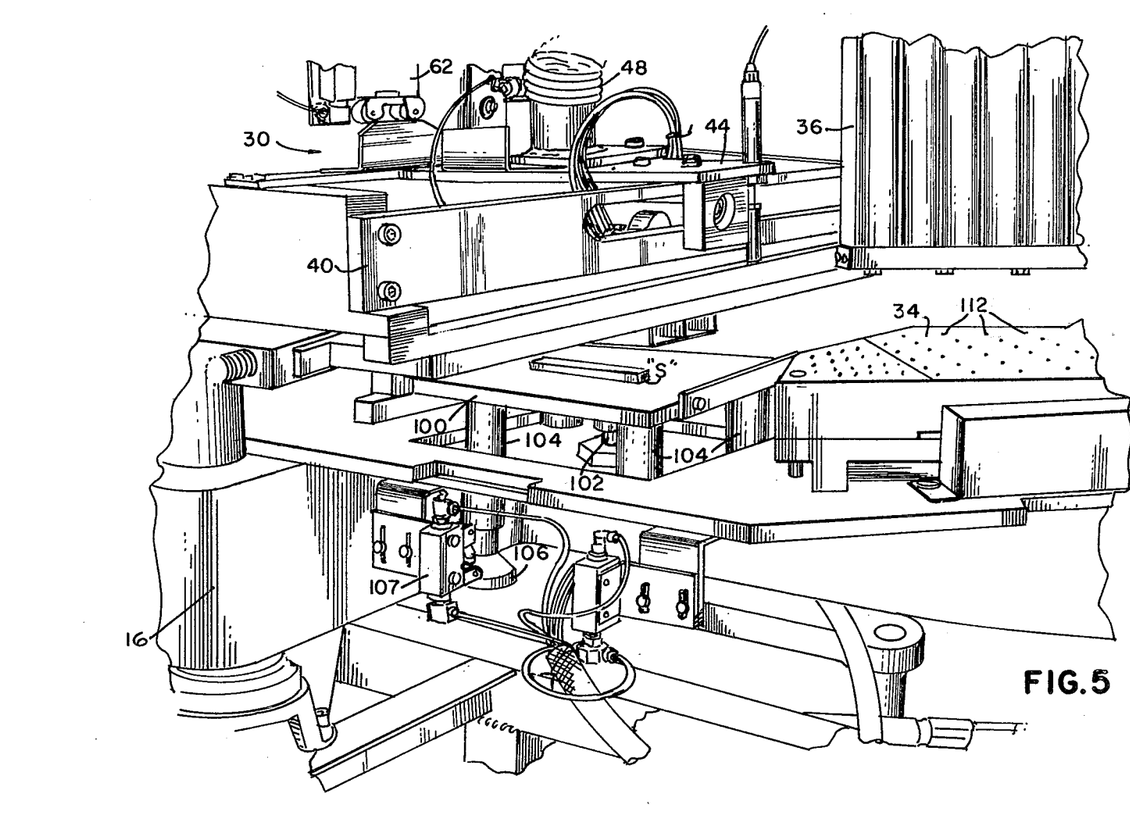
FIG. 5 is a close-up perspective view of the backside of the machine.
Figure 6:
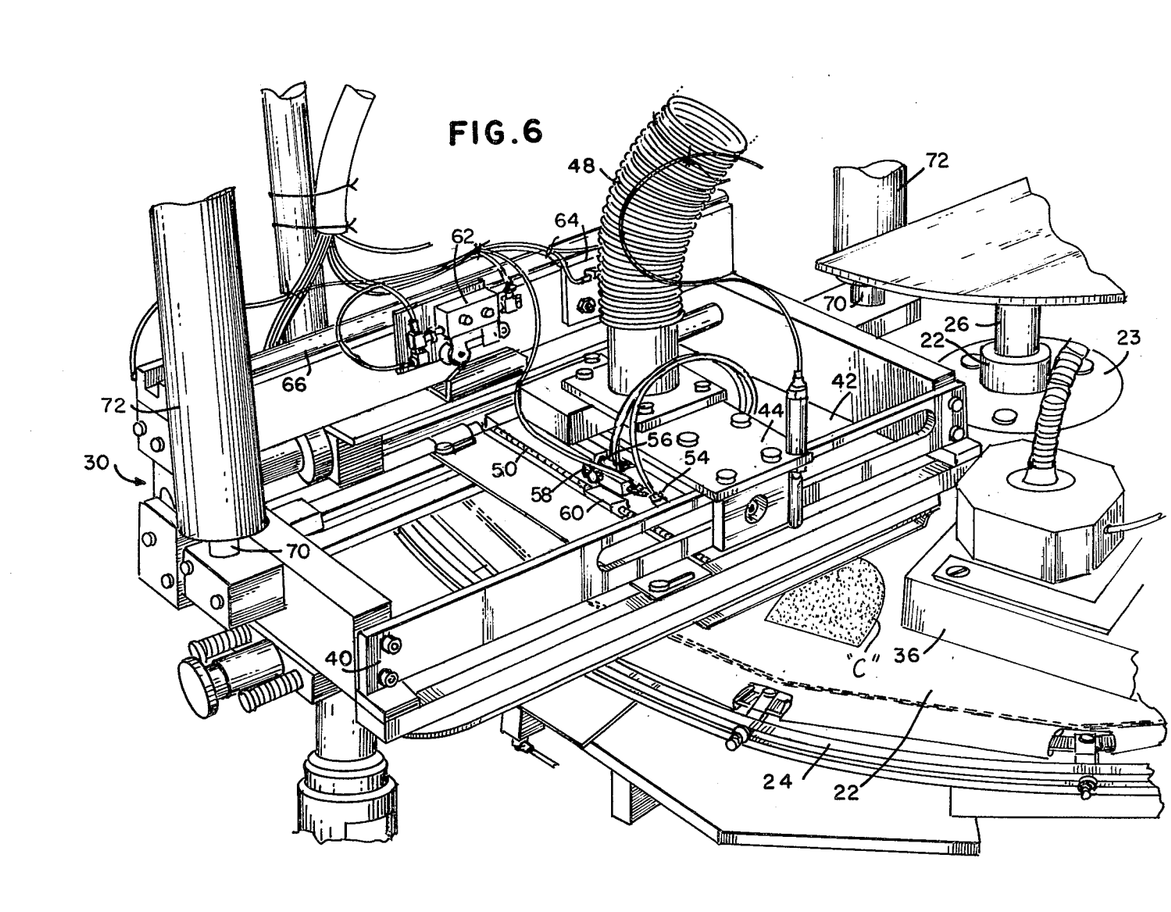
FIG. 6 is a close-up perspective view of the deposition apparatus of the machine.

A lower support plate 100, shown in FIG. 5, mounted on the middle frame portion 16 is movable upwardly and downwardly (toward and away from) the bottom side of the circular receiving surface 22 which for clarity, is omitted from the figure. The lower support plate 100 is motivatable by a pressurizable piston and cylinder unit 102, mounted beneath the plate 100, pressurized from a proper synchronized pressure source, not shown. The lower support plate 100 has a plurality of vertically arranged guide shafts 104, one of which has a cam 106, to enable it to activate a sequencing switch 107, thus providing a link in the synchronizing of the machine 10. A shim "S" may be disposed on the bias plate 100 for certain applications to provide pressure so as to distort the receiving surface 22 at particular locations to provide a scarf on the configuration of powder "C" on the receiving surface 22 as recited in the aforementioned incorporated applications.

Figure 3:
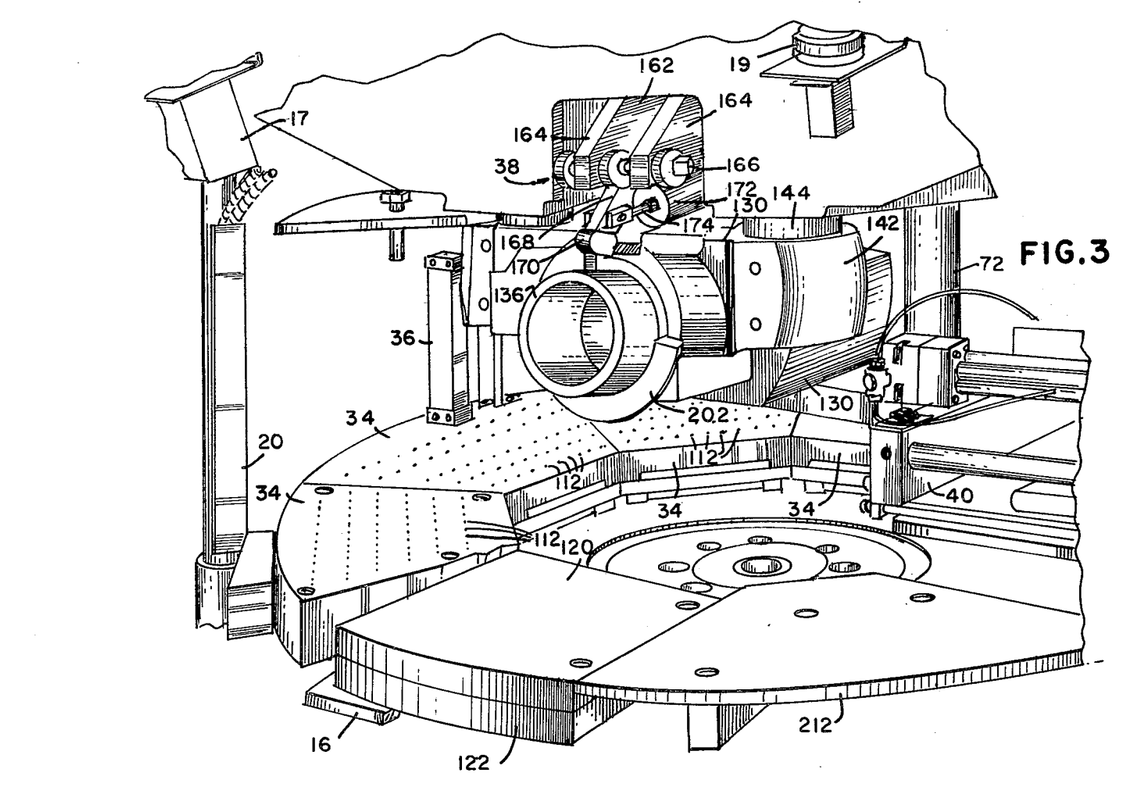
FIG. 3 is a close-up perspective view of the middle frame portion and work stations on the front of the machine, certain elements being omitted for clarity.

The heating station 32, which is located adjacent the deposition station 30, comprises the plurality of arcuate heater segments 34 arranged in an arc of about 240 degrees, on top of the middle frame portion 16. Each arcuate heater segment 34 has a plurality of oriffcii 112 arranged therethrough, which are in fluid communication with a vacuum system, not shown, which vacuum system is in addition to the heating elements therewithin. The heating station 32 also comprises a plurality of square shaped heating units 36 which are each hingedly supported on a hanger 116 suspended from the bottom side of the upper frame portion 14, throughout the arcuate contour of the lower arcuate heater segments 34. The square shaped heating units 36 are electrically activated by interconnection with conduits supplying electrical energy from a proper source, not shown. When it is desired to clean or repair the machine 10 or the circular receiving surface 22, the square shaped upper heating units 36 may be tilted upwardly on their hinges, to permit easier access to the elements thereunder, as shown in FIGS. 3 and 5. It is to be noted that the rotary receiving surface 22 and its hub are omitted from FIGS. 3 and 5, in order to more fully show the elements thereunder.

The third work station 38 comprises chilling means and press/transfer means at the front of the machine, as shown in FIGS. 1, 2 and 4. An arcuate chill plate 120 is disposed over an insulator 122, on top of the middle frame portion 16, as shown in FIG. 3. The chill plate 120 has a cooling arrangement, 121 built therein, in communication with a proper refrigeration means, also not shown.

The press/transfer portion of the machine 10, may be adaptable for uses such as stamping parts out of a material, or pressing portions of two substrates together, as recited herein. The pressing and transfer portion of the third work station 38 comprises a gear housing 130, shown most clearly in FIG. 1, wherein the splined shaft 26 extends downwardly from the gear housing 130, and reciprocably mates with the internally splined hub 23 of the receiving surface 22 above and arranged with the motor "M". The gear housing 130, through a gear arrangement 131 therein, directs rotary motion in a counter-clockwise direction from the splined shaft 26, to a horizontal shaft 134 extending through the middle of the front hub 136, as shown in FIG. 2, on which a transfer cube 140, shown in FIG. 1 is journalled. The gear housing 130 and the front hub 136 are made from a casting having a pair of shoulders 142 shown in FIG. 2, on each side thereof. Each shoulder 142 has a vertical shaft 144 shown in FIG. 3, extending upwardly therefrom, journalled through the upper frame portion 14, and are each secured at their upper end to a respective end of a horizontal beam 150, arranged above the upper frame portion 14. A compression spring 152 with an adjustable damper 154 is set in the middle of the horizontal beam 150, aimed downwardly. A pressurizable piston and cylinder unit 160 is vertically arranged within the upper frame portion 14, between the vertical shafts 144 journalled within the upper frame portion 14, which is pressurizable from a properly sequenceable pressurizable source, not shown. The piston has a piston rod, 161 which extends downwardly therefrom, shown in FIG. 1, and is attached at its lower end, to an inverted "U" shaped bracket 162, the distal ends of the "U" shaped bracket 162 being pivotally attached to the top side of the gear housing 130. The "U" shaped bracket 162 has a pair of tabs 164 which extend off of its forward end. A shaft 166 is horizontally arranged between the tabs 164 of the bracket 162. A driver leg 168 is swingably disposed by one end thereof, on the horizontal shaft 166 extending between the tabs 164. The distal end of the driver leg 168 has a foot portion 170 which protrudes forwardly therefrom. A pressurizable piston and cylinder unit 172, in synchronized fluid communication with a proper pressure source, not shown, is secured to the top of the gear housing 130 and within the confine of the walls of the inverted bracket 162, as shown in FIGS. 1 and 3. A piston rod 174 extends forwardly from the piston and cylinder unit 172, and is pivotally connected at its distal end, to a mid-point of the driver leg 168. The front hub 136 rotatively receives the transfer cube 140, as shown in FIG. 1, by mating with an annular socket 167. The transfer cube 140 has four planar faces which are parallel to its axis of rotation "R". Each face has a partition 180 extending off of its backside edge, perpendicular to its face, as shown in FIG. 1, and each face also has a pair of parallel partitions 182, perpendicular to the face and the edges adjacent its backside edge. A slot 184 is disposed in each partition 180 and 182 on each face, each slot 184 being arranged parallel to its respective face and near the distal end of each partition 180 and 182. A bracket 186 is slidably receivable in the slots 184 in the partitions 180 and 182 extending from each of the four planar faces parallel to the axis of rotation of the cube 140. A biased plate 187 is reciprocably arranged on the outside of each planar face of the cube 140, within the confines of the partitions 180 and 182 thereon, by a biased camming means 190, shown in FIG. 1. Each biased camming means 190, comprises a first lever 192, one end of which is pivotally secured to a stud 189 attached to the middle of the inwardly directed side of each biased plate 187, disposed through an opening in its respective face of the cube 140. The other end of each first lever 192 is bifurcated, having a pin 194 extending through the tines thereof, which end of each first lever 192 mates with a block 196 supported within the cube 140. The pin 194 extends beyond the edges of the tines, and into slots 195 cut into the inner sidewalls of the block 196, in which they (the ends of the pin 194) may slide. A second lever 198, one end of which is pivotally arranged on the pin 194 between the tines of each first lever 192, is hingedly attached at its other end, to a central mount 199 anchored within the transfer cube 140. A biased rod 200, which is journalled rearwardly through the backside of the cube 140, as shown in FIG. 1, is located just radially outwardly of the annular socket 167 is in abutable contact with the rearward surface of the block 196. A spring biased rod 201 is disposed against the front surface of the block 196, having a spring 203 arranged between its forward end, and the front of the transfer cube 140. The rearward end of the rod 200, extending from the backside of the cube 140, is arranged so as to be contactable with a rub-ring 202, shown in FIGS. 1 and 3, disposed about the front hub 136 on the front side of the gear housing 130. The rub-ring 202 is in radial alignment with respect to the radial displacement of the rods 200 extending rearwardly from the cube 140 about its axis of rotation "R". The foot portion 170 protruding forwardly from the distal end of the driver leg 168 is also in radial alignment with the rub-ring 202 and the circular locus of travel of the rods 200 which extend rearwardly from the transfer cube 140.

A stand-off 208, of resilient material such as rubber, or the like, is glued to the outer face of each biased plate 187. The configuration of each stand-off 208, for the particular use recited in this example, is of the outline of a vamp of a shoe upper.

The chill plate 120, disposed beneath the transfer cube 140 upon the middle frame portion 14 has refrigeration means, 121 arranged therewith, in the form of cooling cools connected to a refrigeration unit, not shown to chill the plate 120 to about 32°–100° F.

An arcuate stationary plate 212, shown in FIG. 3 is secured to the middle frame portion 10, contiguous to the chill plate 210 and the deposition station 30, thus completing the annular array of work stations arranged on the middle frame portion 16, and adjacent the locus of travel of the annular receiving surface 22 or belt, which rotates thereabove.

In the method of operating the reinforcing and stiffening apparatus, powdered material, preferably a polymer powder, such as an ionomer, polyethylene, ethylene vinyl acetate powder, polyvinyl choloride or nylon in combination with colors, fillers or other additives, preferably in a size of 35 mesh, or as fine as 50 mesh to 100 mesh for intricate, thin, reinforcement or decorative work, suitable for being spread through a template, heated, fusing, and being adhereable to a substrate, such as a shoe upper or a portion of cloth for a shirt collar, pajama knees or feet, sports clothing or an athletic garment, or the like, is deposited in the hopper 46, supported above the upper frame portion 14 of the apparatus. The powder is permitted to drop down from the hopper 46, through the conduit 48 secured between the hopper 46 and the deposition carriage 44 on the deposition means 30. The powder then lands on top of the stencil assembly, comprising the template or stencil 42, the deposition means 30 having been lowered into contiguous contact with the upper side of the receiving belt or surface 22, because of rotation of the rotatable shaft 84 due to proper synchronized pressurization of the pressurizable piston and cylinder unit 90 secured to the upper frame portion 14. The cam member 86 is therefore caused to rotate, causing the follower wheel 78, rotatable thereagainst, to roll in contiguous relationship therewith, permitting the horizontal bar member 76, to which the follower wheel 78 is attached, to drop slightly. The support rods 70 on each end of the horizontal bar member 76 are thereby permitted to drop slightly, thus lowering the deposition means 30 with whatever spacer means is utilized against the receiving belt 22. The pressurizable piston and cylinder unit 90 on top of the upper frame portion 14, is double acting, so upon synchronized reversal thereof, the depostion means 30 may be lifted slowly from the receiving belt 22 upon proper timing, to permit the three-dimensional configuration of powder "C" placed thereon, to be advanced stepwise in its arcuate path of travel. The lower support plate 100, is moved upwardly into supportive contact with the bottom of the receiving belt 22, time-wise, just before the deposition means 30 is brought into contact downwardly, thereagainst, by proper synchronized actuation of its pressurizable double acting piston and cylinder unit 102, arranged on the middle frame portion 16, therebeneath. The lower support plate 100 is oriented in its proper position by the guide shafts 104, which also has the appropriate cam actuated switches to permit the lower support plate 100 to be moved downwardly at a time just prior to the synchronized upward movement of the deposition means 30, after of course, the three dimensional array of configured powder "C" has been deposited upon the upper surface of the receiving belt 22.

Once the lower support plate 100, has been brought into the aforementioned supportive contact (and distortive contact by the shims "S") with the arcuately advanced receiving belt 22, as shown in copending U.S. patent application Ser. No. 452,964 entitled Linear Deposition Apparatus by R. Simmonds, Jr., et al and the deposition means 30 has been lowered into contact with the receiving belt 22 (more specifically, the spacing elements and the peripheral spacer member of the cut-out on the bottom side of the lower surface of the template 42 into touching contact with the receiving belt 22), the dispenser-carriage 44 is caused to sweep across the frame 40 of the deposition station 30 by interaction with the double acting pressurizable cable cylinder 66, which receives the proper signal to effectuate the sweep of the dispenser-carriage 44, by signal means received when the lower support plate 100 and the deposition means 30 were properly in place. The wiper blades 50, arranged one on each side of the dispenser-carriage 44, are caused to bear down on the upper surface of the template or stencil 42, so that as the dispenser-carriage 44 moves, the wiper blade 50 on the trailing edge of the dispenser-carriage 44 being pressurized by its respective pressurizable piston and cylinder unit 54 effectuate the bearing down pressure, to sweep the powder into the cut-out in the template 42. The wiper blades 50 move reciprocably, about their common pivot axis, so that when the dispenser-carriage 44 reverses direction for a return sweep across the template or stencil 42, the return sweep trips a switch to effectuate the dropping of the lower support plate 100, the raising of the deposition means 30, and the arcuate stepwise advancement of the receiving belt 22 with its cargo of configured powder "C" in a three dimensional array thereon, to the heating station 32, where successive arcuate advancement causes the powder on the receiving belt 22 to heat at each 45 degree spaced apart heating unit, to fuse the powder into a molten mass, permitting it to retain however, its three-dimensional thick, skived, or tapered configuration.

The configuration of fused powder advances to the chill and release station 38, whereupon it is held for about 1–2 seconds and caused to be chilled, from its bottom side upwardly, by the chill plate 120, to a temperature of about 32°–100° F. from beneath the receiving belt 22, the top side of the three-dimensional configuration of fused powder being tacky, for adhesion (if desired), to a substrate such as a shoe upper, a piece of shirt/pajama cloth, sports equipment or the like, or for subsequent lifting (peeling) from the receiving surface as it advances, for adhesion to a substrate at some further point in its manufacturing cycle.

The configuration of three-dimensional powder "C" preferably receives the substrate, be it the upper of a shoe or a piece of cloth in need of reinforcement or stiffening, from the transfer cube 140. As the receiving belt is advanced in 45 degree increments, the transfer cube 140 is rotated 90 degree increments through the interrelationship of the two components via the mating gears 131 in the gear housing 130, to present the substrate "U" held by the transfer cube 140 just over a configuration of powder "C" upon the chilled plate 120, similar to the orientation shown in FIG. 1, for the subsequent synchronized pressing of the components together. The transfer cube 140 is caused to move downwardly in timed response to the arrival of the fused configuration of powder "C" on the chill plate 120 by synchronized pressurization of the double acting pressurizable piston and cylinder unit 160 arranged within the upper frame portion 14. The operator of the machine 10 loads a fresh (unreinforced-unstiffened) substrate into the to space outwardly of (above when loading) the biased plate 187 and resilient shaped stand-off 208 and the cut-out plate 186 secured in the grooves 184 in the partitions 180 and 182, on the transfer cube 140, in the "12 o'clock" position. When the biased plate 187 is retracted toward the axis of rotation "R" of the transfer cube 140, by the depression of a foot treadle, not shown, by the operator's foot, which depression will actuate (pressurize) the pressurizable piston and cylinder unit 172 whose piston rod 174 is in pivotable conjuncture with the driver leg 168 behind the transfer cube 140. The foot 170 on the distal end of the driver leg 168 thus pushes forwardly (towards the front of the transfer cube 140) pushing against the particular biased rod 200 currently at the "12 o'clock" position, which rod 200 extends rearwardly from the back of the transfer cube 140, and which is in radial alignment with the rub-ring 202, one rod for each biased plate 186 on the faces of the transfer cube 140. The foot 170 thus pushes the biased rod 200 forwardly to hingedly push on the pin 194 which holds the first and second levers 192 and 198, together, the pin 194 being held at both ends thereof, by the slots 195 in the block 196, the effect of which is to cause axial displacement of the block 196 and the biased rod 201, compressing the spring 203, and effectuating radial displacement of the biased plate 187. Actuation of the start switches 17 by the operator is effective to cause rotation of the transfer cube 140 about the axis "R", the biased rod 200 then coming into rubbing contact with the rub-ring 202 as the rod 200 is caused to traverse counter-clockwise out of the "12 o'clock" position, the levers 192 and 198 as well as the bias plate 187 assuming the orientation shown in FIG. 1 in its' "6 o'clock" position, just prior to actuation/pressurization of the piston and cylinder unit 160, to press the transfer cube 140 downwardly, with whatever substrate is held therewith, a shoe upper "U", being shown in FIG. 1, against a configuration of powder "C" on the receiving belt 22 supported by the chill plate 120. The three dimensional configuration of fused powder "C", as described in the aforementioned incorporated reference may then be pressed by the resilient stand-off 208 and issued as a product by itself, or be pressed by and attached to a flexible substrate being held between the resilient stand-off 208, and the cut out in the bracket 186. Subsequent advancement of the transfer cube 140 counter clockwise around its axis of rotation 270 degrees from the "12 o'clock position to the "3 o'clock position", will release the biased rod 200 from contact with the rub-ring 202. Thus withdrawing the biased plates 187, in succession, from their loaded configuration, withdrawing the resilient shaped pad 208 from behind the flexible substrate and from the cut-out in the cut-out plate 186, permits the operator to remove the newly reinforced or stiffened substrate cloth, leather or whatever, as the case may be. Subsequent turning of the transfer cube 140 through 90 degrees, will present an unloaded, unbiased biased plate 187 to the top (12 o'clock) location for loading of a subsequent substrate and biasing thereof between the resilient pad 208 and the cut-out in the cut-out plate 186.

Examples of powders usable here, as well as operating parimeters of the apparatus, are recited herein, by the following:

(A) A preferred utilization of the present invention comprises the reinforcement of stiffening of a shoe upper. A 35–50 mesh ionomer powder of the sodium cation type having: a melt index of 2.5, a flexural modulus of 51,000 psi, a heat softening temperature (Vicat) 63° C., with no additives. A pattern template is prepared to the particular shape desired and placed on an 8 mesh screen woven from 0.015 inch stainless steel wire. The choice of an 8 mesh screen represents a balance of opposing factors:

a—fine mesh produces a smooth action to the wiper blades;
b—too thick a screen wire size makes the scarf or taper edge too thick;
c—coarse, small diameter wire mesh presents less surface for residual powder particles to cling to or bridge across.

Spacer means on the bottom of the stencil are utilized for an approximately 0.040 inch thick fused product. Considering the bulk density and flow behavior of the powder, a 0.100 inch thick peripheral gasket is used on the bottom side of the stencil means. The scarf shim "S", on the lower support surface is adjusted thereon so as to distort the "no-spacer means" portion of the receiving belt into contact with the bottom surface of the stencil means as to provide a proper (desired) taper on the powder applied on the receiving belt and within the confines of the peripheral gasket.

In the heating station, the lower heating units are set for about 490° F. Each radiant heater above the receiving belt is set for about a 600° F. surface temperature thereof.

The deposition mechanism is actuated to allow an overall time of about 25 seconds for fusing the powder on the receiving belt, at which time, the product is transferred to the final station for application to the substrate, here the bottom of a shoe upper, then chilled to about 30° F. to 100° F. for about 1–2 seconds by the chill plate as it is pressed thereagainst.

The final product for a box toe shoe upper is tapered from 0.012 inches thick at its scarf edge, to 0.035 inches thick along its full edge.

(B) A further example includes the preferred utilization above-described, having as additions in the powder 0.3% polyalkoxy tertiary amine as an antistatic agent, and 0.3% fine silica as a dryer and flow promoter, resulting in less residual powder on the screen and less electrostatic motion of the powder particles during the deposition process, as well as having the printed pattern of a higher quality. The product here may be 0.040 inches thick at its full edge.

(C) A still further example includes the earlier described preferred configuration (A) having as its additives: 0.05% conductive furnace black. The deposition behavior, flow behavior and product pattern are similar to example (B). The time for fusion at the heating station may be reduced here, to about 20 seconds, having a product thickness of about 0.040 inches.

(D) For a flexible box toe for mens' or womens' shoes, a 35 mesh low density polyethylene powder may be used, having a melt index of 22, a flexural modulus of 19,000 psi, a heat softening temperature (Vicat) of 83° C. with no additives. The lower heating block is raised to a temperature of about 400° F., the upper radiant heater at about 500° F. for a tapered product from about 0.012 to 0.035 inches and a heating (fusion) time of about 18 seconds.

(E) For a soft box toe for slippers, womens' and some childrens' shoes, a 35 mesh ethylene vinyl acetate copolymer, having a melt index of 9, a flexural modulus of about 13,500 psi and a heat softening temp. of about 59° C. The machine conditions are the same as those for example (D), in a heating (fusing) time of 12 seconds producing a tapered product of from about 0.012 to 0.035 inches thick.

(F) If the apparatus is to be used for throat reinforcement, eyelet stay or topline reinforcement for a shoe upper, then the preferred powder is 100 mesh nylon 12 and 0.3 % polyalkoxy tertiaryamine. The stencil screen would be of about 30 mesh size. This particular product is not tapered, therefore the gasket is arranged about the entire periphery of the cut-out, and is of uniform thickness, of the type of "dot" spacers 0.040 inches thick, utilizing machine conditions as in example A, with a heating time of 12 seconds and a print pattern thickness of 0.017 inches, the "dot" spacers being shown and described more fully in copending U.S. patent application Ser. No. 451,918 entitled Stencil Apparatus by A. Morse et al and assigned to the present assignee.

(G) A thin film reinforcement similar to example F wherein a 100 mesh vinyl powder and 0.3% polyalkoxy tertiary amine powder is used, with a heat stabilizer if desired, having the same deposition means, conditions and results as in the previous example.

Typical colorment pigments useful for coloring plastics may be pre-mixed with the powder in the hopper, to provide the decorating characteristics, pigments being carbon black for one example.

Thus, there has been shown and described an arrangement for producing reinforcing and/or stiffening and/or decorating means for footwear or articles of clothing, from a fusible powder, which powder can be configured in a three-dimensional array, to a desired taper and thickness, depending on the thickness of the template cut-out peripheral member, for same operation application (if desired) of that three-dimensional configuration of powder after proper heating and fusing thereof, eliminating costly and messy operations and procedures common with the prior art.

It is submitted, that the appended claims are to be interpreted as exemplary only, and not in a limiting sense.

We claim:

1. A machine for operaing on a fusible powder for a substrate, comprising:
    a frame member;
    an annular receiving surface rotatably disposed in a horizontal manner in a journal in said frame member;
    means for intermittently rotating said annular receiving surface;
    means for intermittently depositing a configuration of powdered material on said annular receiving surface in between successive periods of rotative advancement of said receiving surface;
    means for intermittently treating said deposited powder to transform said powder into a fused three-dimensional configuration thereof; and
    means for intermittently withdrawing said fused configuration from said annular receiving surface in between successive periods of rotative advancement of said receiving surface.

2. A machine for operating on a fusible powder for a substrate, as recited in claim 1, including means for cooling said fused configuration, from one side thereof.

3. A machine for operating a fusible powder for a substrate, as recited in claim 2, including means for sequentially presenting an unreinforced flexible substrate onto said fused configuration, which also comprises said means for withdrawing said fused configuration from said annular receiving surface.

4. A machine for operating on a fusible powder for a substrate, as recited in claim 3, including:
    means for holding said annular receiving surface against said sequential treatment means, during transformation of said configuration of powder to a fused configuration.

5. A machine for operating on a fusible powder for a substrate, as recited in claim 4, wherein said means for holding said annular surface against said sequential treatment means comprises an array of vacuum members arranged within said sequential treatment means.

6. A machine for depositing a fusible configuration of powder on a substrate, as recited in claim 5, wherein said sequential treatment means comprises an arcuate array of heating elements arranged beneath said annular receiving surface.

7. A machine for operating on a fusible powder for a substrate, as recited in claim 6, wherein said sequential treatment means also comprises an arcuate arrangement of heating means arranged above said annular receiving surface.

8. A machine for operating on a fusible powder for a substrate, as recited in claim 7, including an article processing mechanism for sequentially receiving, transferring and presenting an unreinforced flexible substrate against said fused configuration.

9. A machine for operating on a fusible powder for a substrate, as recited in claim 7, wherein said arcuate array heating means are articulatable with respect to said annular receiving surface.

10. A machine for operating on a fusible powder for a substrate, as recited in claim 7, wherein said substrate comprises a portion of footwear.

11. A machine for operating on a fusible powder on a substrate, as recited in claim 7, wherein said substrate comprises a portion of cloth.

* * * * *